United States Patent
Li (10) Patent No.: US 9,521,546 B2
(45) Date of Patent: Dec. 13, 2016

(54) SECURE RF COMMUNICATION METHOD, TERMINAL AND SYSTEM

(75) Inventor: Meixiang Li, Shenzhen (CN)

(73) Assignee: NATIONZ TECHNOLOGIES INC., Shenzhen, Guangdong (CN)

( * ) Notice: Subject to any disclaimer, the term of this patent is extended or adjusted under 35 U.S.C. 154(b) by 350 days.

(21) Appl. No.: 14/235,046

(22) PCT Filed: Aug. 28, 2012

(86) PCT No.: PCT/CN2012/080660
§ 371 (c)(1),
(2), (4) Date: Jan. 25, 2014

(87) PCT Pub. No.: WO2013/029527
PCT Pub. Date: Mar. 7, 2013

(65) Prior Publication Data
US 2014/0349608 A1 Nov. 27, 2014

(30) Foreign Application Priority Data
Aug. 29, 2011 (CN) .......................... 2011 1 0250429

(51) Int. Cl.
*H04M 1/66* (2006.01)
*H04W 12/04* (2009.01)
(Continued)

(52) U.S. Cl.
CPC ............ *H04W 12/04* (2013.01); *H04L 9/0827* (2013.01); *H04L 9/3215* (2013.01); *H04L 63/18* (2013.01);
(Continued)

(58) Field of Classification Search
CPC . H04B 5/0031; H04B 5/0075; H04L 2209/80; H04L 63/18; H04L 9/0827; H04L 9/3215; H04W 12/02; H04W 12/04; H04W 12/12
(Continued)

(56) References Cited

U.S. PATENT DOCUMENTS

| | | | | |
|---|---|---|---|---|
| 2002/0007452 A1* | 1/2002 | Traw | ....................... | G06F 21/10 713/152 |
| 2004/0159700 A1* | 8/2004 | Khan | ..................... | G06Q 20/02 235/380 |

(Continued)

*Primary Examiner* — Khai M Nguyen
(74) *Attorney, Agent, or Firm* — Young Basile Hanlon & MacFarlane, P.C.

(57) ABSTRACT

A method, terminal and secure RF communication system are provided. The method for radio frequency secure communication of the invention comprises: generating magnetic channel data, and transmitting the magnetic channel data via a magnetic channel; establishing a radio frequency link with a peer device which feeds back a response information of the magnetic channel data; generating first radio frequency data, encrypting the first radio frequency data using the magnetic channel data, and transmitting the encrypted first radio frequency data to the peer device via the radio frequency link; and/or receiving encrypted second radio frequency data transmitted by the peer device via the radio frequency link, and decrypting the encrypted second radio frequency data using the magnetic channel data. By the above technical solution, the invention avoids the risk that a preset key is intercepted or decrypted, and enhances the security of the radio frequency link data exchanging process.

14 Claims, 4 Drawing Sheets

(51) Int. Cl.
    *H04L 9/08*    (2006.01)
    *H04L 9/32*    (2006.01)
    *H04W 12/02*   (2009.01)
    *H04L 29/06*   (2006.01)
    *H04W 12/12*   (2009.01)
    *H04B 5/00*    (2006.01)

(52) U.S. Cl.
    CPC ............ *H04W 12/02* (2013.01); *H04B 5/0031* (2013.01); *H04B 5/0075* (2013.01); *H04L 2209/80* (2013.01); *H04W 12/12* (2013.01)

(58) Field of Classification Search
    USPC .......................... 455/411, 410, 550.1, 414.1
    See application file for complete search history.

(56) References Cited

U.S. PATENT DOCUMENTS

| | | | |
|---|---|---|---|
| 2004/0210756 A1* | 10/2004 | Mowers | H04L 63/0807 713/168 |
| 2005/0137986 A1* | 6/2005 | Kean | G06Q 20/327 705/65 |
| 2008/0229389 A1* | 9/2008 | Singh | G06F 21/6209 726/3 |
| 2009/0224884 A1* | 9/2009 | Tuttle | G06K 7/0008 340/10.1 |
| 2010/0272256 A1* | 10/2010 | Baras | H04L 9/088 380/46 |
| 2011/0106954 A1* | 5/2011 | Chatterjee | G06F 1/1632 709/227 |
| 2011/0165862 A1* | 7/2011 | Yu | H04M 1/7253 455/411 |

* cited by examiner

SECURE RF COMMUNICATION METHOD, TERMINAL AND SYSTEM

FIELD OF THE INVENTION

This invention relates to the field of communication and, more particularly, to a secure radio frequency (RF) communication method, terminal, and a secure RF communication system.

BACKGROUND

With the popularization of mobile terminals, demands for realizing electronic payments using the mobile terminals become very urgent. Nowadays, the electronic payment technology has a variety of implementations. One of the implementations is realized through integrating a 2.4 GHz radio frequency (RF) communication module, a magnetic coupling coil and a magnetic induction processing module in a mobile phone SIM (Subscriber Identity Model) card or SD (Secure Digital) Card. In this type of implementation, through detecting strength of a magnetic coupling signal and receiving magnetic channel information by the SIM card or SD card installed in the mobile phone, the 2.4 GHz radio frequency communication module integrated in the SIM card or SD card is activated and data transaction communication is performed. Because the magnetic coupling signal energy in the space attenuates with the distance to the third power and has a very good consistency for different mobile phones, so this implementation realizes RF high-speed data exchange and effectively controls RF data communication distance of the SIM card or SD card on a variety of mobile phone terminals, thus becoming a reliable mobile terminal electronic payment solution. In addition, the entire receiving and processing system is integrated in the SIM card or SD card and no modification for the mobile phone terminal is needed, so it has excellent application promotion value. However, due to absence of appropriate protective measures, when data transactions are performed, current RF channel parameters may be obtained by an attacker through analysis, so as to establish a connection with the activated RF card, thus raising security risks.

BRIEF SUMMARY OF THE DISCLOSURE

The main technical problems to be solved by the present invention include providing a secure radio frequency (RF) communication method, terminal and a secure RF communication system, enhancing the security of the RF link data transaction process.

In order to solve the above technical problems, the technical solutions used in the present invention include follows:

A method for radio frequency secure communication, comprising:

generating magnetic channel data, and transmitting the magnetic channel data via a magnetic channel;

establishing a radio frequency link with a peer device which feeds back response information of the magnetic channel data;

generating first radio frequency data, encrypting the first radio frequency data using the magnetic channel data, and transmitting the encrypted first radio frequency data to the peer device via the radio frequency link; and/or receiving encrypted second radio frequency data transmitted by the peer device via the radio frequency link, and decrypting the encrypted second radio frequency data using the magnetic channel data.

In one embodiment, the process for establishing a radio frequency link with a peer device which feeds back response information of the magnetic channel data includes:

based on the magnetic channel data, calculating parameters of the radio frequency channel; and based on the parameters of the radio frequency channel, receiving response information of the magnetic channel data fed back from the peer device on a corresponding radio frequency channel.

In one embodiment, the parameters of the radio frequency channel include an RF frequency point and a radio frequency address.

In one embodiment, the first radio frequency data is application data, and the second radio frequency data is response data of the application data.

In one embodiment, the magnetic channel data is generated randomly.

A method for radio frequency secure communication, comprising:

receiving magnetic channel data via a magnetic channel;

establishing a radio frequency link with a peer device which sends the magnetic channel data;

generating third radio frequency data, encrypting the third radio frequency data using the magnetic channel data, and transmitting the encrypted third radio frequency data to the peer device via the radio frequency link; and/or receiving encrypted fourth radio frequency data transmitted by the peer device via the radio frequency link, and decrypting the encrypted fourth radio frequency data using the magnetic channel data.

In one embodiment, the process for establishing a radio frequency link with a peer device which transmits the magnetic channel data includes:

based on the received magnetic channel data, calculating parameters of the radio frequency channel; and based on the parameters of the radio frequency channel, sending response information of the magnetic channel data to the peer device on a corresponding radio frequency channel.

In one embodiment, before calculating parameters of the radio frequency channel based on the magnetic channel data, the process further includes:

detecting magnetic signal strength of the magnetic channel data;

determining whether the detected magnetic signal strength is greater than a preset value; and if the detected magnetic signal strength is greater than the preset value, based on the received magnetic channel data, calculating parameters of the radio frequency channel.

In one embodiment, the parameters of the radio frequency channel include an RF frequency point and a radio frequency address.

In one embodiment, the fourth radio frequency data is application data, and the third radio frequency data is response data of the application data.

A terminal, comprising: a magnetic signal generator module configured to generate magnetic channel data and transmit the magnetic channel data via a magnetic channel; a radio frequency transceiver module configured to establish a radio frequency link with a peer device which feeds back response information of the magnetic channel data, transmit encrypted first radio frequency data to the peer device via the radio frequency link, and receive encrypted second radio frequency data transmitted by the peer device via the radio frequency link; and a control module configured to generate the first radio frequency data, encrypt the first radio frequency data using the magnetic channel data, transmit the encrypted first radio frequency data to the radio frequency transceiver module, and decrypt the encrypted second radio frequency data using the magnetic channel data.

In one embodiment, the magnetic signal generator module includes a magnetic channel data generator sub-module and a magnetic signal generator sub-module. The magnetic channel data generator sub-module is configured to generate the magnetic channel data. The magnetic signal generator sub-module is configured to transmit the magnetic channel data via the magnetic channel.

In one embodiment, the control module includes a transformation sub-module configured to, based on the magnetic channel data, calculate parameters of the radio frequency channel.

In one embodiment, the radio frequency transceiver module is configured to, based on the parameters of the radio frequency channel, receive response information of the magnetic channel data fed back from the peer device on a corresponding radio frequency channel.

In one embodiment, the control module includes an application module and an encryption and decryption module. The application module is configured to generate the first radio frequency data, transmit the first radio frequency data to the encryption and decryption module, and perform a corresponding applied process to the second radio frequency data decrypted by the encryption and decryption module. The encryption and decryption module is configured to encrypt the first radio frequency data using the magnetic channel data, transmit the encrypted first radio frequency data to the radio frequency transceiver module, decrypt the encrypted second radio frequency data transmitted by the peer device using the magnetic channel data, and transmit the decrypted second radio frequency data to the application module.

A terminal, comprising: a magnetic induction module configured to receive magnetic channel data sent from outside via a magnetic channel; a radio frequency transceiver module configured to establish a radio frequency link with a peer device which transmits the magnetic channel data, transmit the encrypted third radio frequency data to the peer device via the radio frequency link, and receive the encrypted fourth radio frequency data transmitted by the peer device via the radio frequency link; and a control module configured to generate the third radio frequency data, encrypt the third radio frequency data using the magnetic channel data, transmit the encrypted third radio frequency data to the radio frequency transceiver module, and decrypt the encrypted fourth radio frequency data using the magnetic channel data.

In one embodiment, the control module includes a transformation sub-module configured to, based on the magnetic channel data received by the magnetic induction module, calculate parameters of the radio frequency channel.

In one embodiment, the radio frequency transceiver module is configured to, based on the parameters of the radio frequency channel, send response information of the magnetic channel data to the peer device on a corresponding radio frequency channel.

In one embodiment, the control module also includes a detection sub-module and a determination sub-module. The detection sub-module is configured to detect magnetic signal strength of the magnetic channel data received by the magnetic induction module. The determination sub-module is configured to determine whether the detected magnetic signal strength is greater than a preset value. The transformation sub-module is configured to, based on the magnetic channel data received by the magnetic induction module, calculate the parameters of the radio frequency channel when the determination sub-module determines that the magnetic signal strength is greater than the preset value.

In one embodiment, the control module includes an application module and an encryption and decryption module, where:

the application module is configured to generate the third radio frequency data, transmit the third radio frequency data to the encryption and decryption module, and perform a corresponding applied process to the fourth radio frequency data decrypted by the encryption and decryption module; and the encryption and decryption module is configured to, after encrypting the third radio frequency data using the magnetic channel data, transmit the encrypted third radio frequency data to the radio frequency transceiver module, and decrypt the encrypted fourth radio frequency data transmitted by the peer device using the magnetic channel data, and transmit the decrypted data to the application module.

A secure RF communication system comprises a first terminal according to any one of above options and at least one second terminal according to any one of above options. The first terminal and the second terminal transmit magnetic channel data via a magnetic channel, and decrypt and encrypt the radio frequency data transmitted on the radio frequency link between the first terminal and the second terminal using the magnetic channel data.

In one embodiment, the first terminal is a card reader, and the second terminal is a terminal with a built-in radio frequency card.

In one embodiment, the RF card is one of a radio frequency SIM card or a radio frequency SD card.

Advantageous effects of the present invention: the RF data transmitted on the RF link is encrypted using the magnetic channel data transmitted on the magnetic channel. That is, the data transmitted on the RF link is encrypted using security control information transmitted on the magnetic channel. Because transmission distance of the magnetic channel is short and it is not easy to be intercepted, even if an attacker fakes a peer device using a public protocol specification, and establishes a connection with the activated second terminal from a distance, because the magnetic channel data as a security key for data encryption cannot be stolen, the process of encrypting or decrypting the RF data cannot be completed, avoiding the risk that the preset key is intercepted or decrypted. Thus, a substantive transaction attack cannot be implemented, enhancing the security of the radio frequency link data exchange process. At the same time, the RF data transmitted on the RF link is directly encrypted using the magnetic channel data and does not require a dedicated key distribution management system, thereby reducing the difficulty and costs of security maintenance.

Further, based on the magnetic channel data, the devices on both ends calculate the parameters of the radio frequency channel and establish a corresponding radio frequency link, further simplifying the RF link establishment process.

DETAILED DESCRIPTION

The present invention is further illustrated through some specific embodiments in combination with the drawings provided below.

The main idea of the invention is that, between a first terminal and a second terminal, at the beginning, magnetic channel data is transmitted via a magnetic channel; then, the radio frequency (RF) data transmitted on a radio frequency link between the first terminal and the second terminal is encrypted and decrypted by using the magnetic channel data, enhancing the security of data exchange process on the radio frequency link. The first terminal includes, but is not limited to, a card reader device, such as a card reader. The second terminal includes but is not limited to a built-in RF card terminal, such as a mobile terminal. The RF card includes, but is not limited to, an RF subscriber identity module (SIM) card and an RF Secure Digital Card (SD) card. The radio frequency data transmitted on the radio frequency link includes, but is not limited to, application data and response data of the application data.

Figure 1:
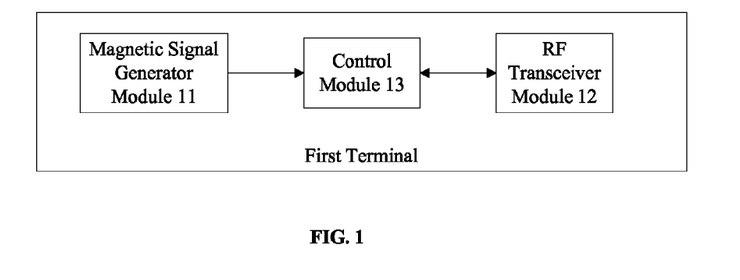
FIG. 1 illustrates a structure schematic diagram of an exemplary first terminal consistent with the disclosed embodiments.

Referring to FIG. 1, FIG. 1 is a structure schematic diagram of a first terminal provided by one embodiment of the present invention. The first terminal includes a magnetic signal generator module 11, an RF transceiver module 12, and a control module 13. The magnetic signal generator module 11 is configured to generate magnetic channel data and to transmit the magnetic channel data via a magnetic channel. The RF transceiver module 12 is configured to establish a radio frequency link with a second terminal which feeds back a response information of the magnetic channel data, to transmit the encrypted first radio frequency data to the peer device via the radio frequency link, and/or to receive the encrypted second radio frequency data transmitted by the peer device via the radio frequency link. The control module 13 is configured to generate the first radio frequency data, after the first radio frequency data is encrypted using the magnetic channel data, to transmit the encrypted first radio frequency data to the RF transceiver module, and to decrypt the encrypted second radio frequency data using the magnetic channel data.

Specifically, the first radio frequency data may be application data sent from the first terminal to the second terminal; and the second radio frequency data may be response data of the application data fed back from the second terminal to the first terminal.

Figure 2:
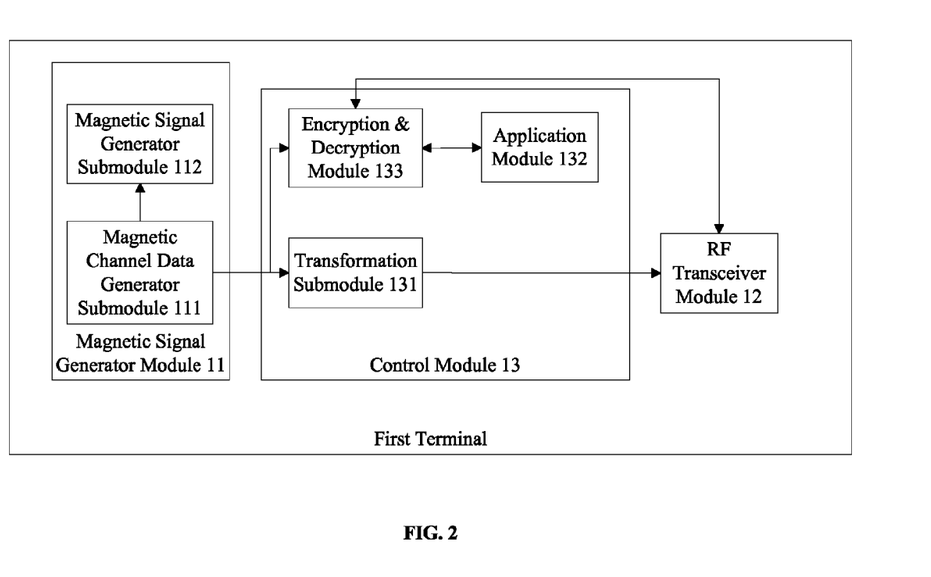
FIG. 2 illustrates a structure schematic diagram of another exemplary first terminal consistent with the disclosed embodiments.

Referring to FIG. 2, FIG. 2 is a structure schematic diagram of a first terminal provided by another embodiment of the present invention. The first terminal includes a magnetic signal generator module 11, an RF transceiver module 12 and a control module 13. The magnetic signal generator module 11 includes a magnetic channel data generator sub-module 111 and a magnetic signal generator sub-module 112. The control module 13 includes a transformation sub-module 131, an application module 132, and an encryption and decryption module 133. The transformation sub-module 131 connects with the magnetic channel data generator sub-module 111 and the RF transceiver module 12, respectively. The encryption and decryption module 133 connects with the application module 132, the magnetic channel data generator sub-module 111 and the RF transceiver module 12, respectively. The magnetic channel data generator sub-module 111 also connects with the magnetic signal generator sub-module 112.

The magnetic channel data generator sub-module 111 is configured to generate magnetic channel data randomly. The magnetic signal generator sub-module 112 is configured to transmit the magnetic channel data via a magnetic channel. The transformation sub-module 131 is configured to, based on the magnetic channel data generated by the magnetic channel data generator sub-module 111, calculate the parameters of the radio frequency channel. The RF transceiver module 12 is configured to, based on the parameters of the radio frequency channel obtained by the transformation sub-module 131, receive response information of the magnetic channel data fed back from the second terminal on a corresponding radio frequency channel, and establish a radio frequency link with the second terminal. The application module 132 is configured to generate the first radio frequency data, and transmit the first radio frequency data to the encryption and decryption module 133. The encryption and decryption module 133 is configured to, after encrypting the first radio frequency data using the magnetic channel data generated by the magnetic channel data generator sub-module 111, transmit the encrypted first radio frequency data to the RF transceiver module 12. The RF transceiver module 12 is configured to transmit the encrypted first radio frequency data to the second terminal via the radio frequency link. The RF transceiver module 12 is also configured to receive the encrypted second radio frequency data transmitted by the second terminal via the radio frequency link, and transmit the encrypted second radio frequency data to the encryption and decryption module 133. The encryption and decryption module 133 is also configured to decrypt the encrypted second radio frequency data transmitted by the second terminal using the magnetic channel data generated by the magnetic channel data generator sub-module 111, and transmit the decrypted data to the application module 132. The application module 132 is also configured to perform a corresponding applied processing to the second radio frequency data decrypted by the encryption and decryption module 133.

In the present embodiment, based on the magnetic channel data generated by the magnetic channel data generator sub-module 111, the method for calculating the parameters of the radio frequency channel by the transformation sub-module 131 may include performing an irreversible transformation to the magnetic channel data generated by the magnetic channel data generator sub-module 111 and generating the corresponding parameters of the radio frequency channel based on the result of the transformation. Based on the parameters of the radio frequency channel, the RF transceiver module 12 receives and transmits the RF information on the corresponding radio frequency channel. In the present embodiment, the encryption and decryption module 133 may also be integrated in the magnetic signal generator module 11. That is, the magnetic signal generator module 11 encrypts and decrypts the radio frequency data. In the present embodiment, the parameters of the radio frequency channel include an RF frequency point and an address. Based on the RF frequency point and the address, the corresponding radio frequency channel is obtained. The first radio frequency data may be application data to be sent from the first terminal to the second terminal; the second radio frequency data may be response data of the application data fed back from the second terminal to the first terminal.

In the present embodiment, the first terminal generates the magnetic channel data randomly by the magnetic signal generator module. Based on the magnetic channel data, the transformation sub-module calculates the parameters of the radio frequency channel. Based on the parameters of the radio frequency channel, the RF transceiver module establishes a radio frequency link with the second terminal. The encryption and decryption module continues to encrypt the first radio frequency data to be transmitted to the second terminal using the magnetic channel data. The RF transceiver module transmits the first radio frequency data encrypted by the encryption and decryption module to the second terminal via the radio frequency link. Because the generated magnetic channel data is random and it is only valid at the current transaction, the risk that the magnetic channel data is intercepted or cracked can be avoided. At the same time, the magnetic channel data is performed an irreversible transformation. Based on the irreversible result, the parameters of the radio frequency channel are generated. Thus, even if an attacker obtains the parameters of the current radio frequency channel by analysis, the attacker cannot obtain the currently generated magnetic channel data, enhancing the security of the magnetic channel data as a secret key for data encryption. That is, by using the first terminal of the embodiment, even if the attacker fakes a magnetic communication RF base station using a public protocol specification, and establishes a connection with the second terminal activated by the first terminal from a distant location, because the magnetic channel data that is generated when the first terminal activates the second terminal cannot be obtained, the process for encrypting or decrypting the RF data cannot be completed. Therefore, a substantive transaction attack cannot be implemented, further enhancing the security of the radio frequency link data exchanging process. In addition, this implementation does not require a dedicated key distribution management system, thereby reducing the difficulty and costs of security maintenance.

Figure 3:
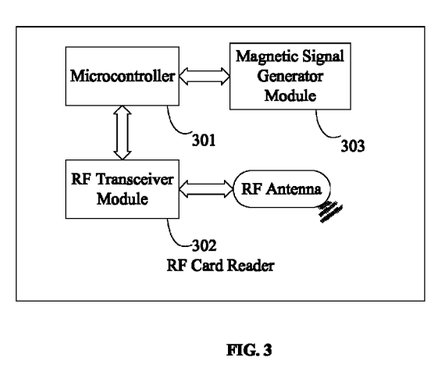
FIG. 3 illustrates a structure schematic diagram of an exemplary radio frequency (RF) card reader consistent with the disclosed embodiments.

Referring to FIG. 3, FIG. 3 is a structure schematic diagram of an RF card reader provided by one embodiment of the present invention. The RF card reader includes at least one microcontroller 301, at least one RF transceiver module 302 with an RF antenna, and at least one magnetic signal generator module 303. The RF antenna is configured to detect and radiate an RF signal. The RF transceiver module 302 and at least one microcontroller 301 are configured to transmit/receive the RF data between an RF card reader and an RF card. The magnetic signal generator module 303 connects with the microcontroller 301. The magnetic signal generator module 303 is configured to generate magnetic channel data randomly, and to transmit the magnetic channel data via a magnetic channel. The microcontroller 301 is configured to, based on the magnetic channel data generated by the magnetic signal generator module 303, to calculate the parameters of the radio frequency channel, to generate the first radio frequency data, after the first radio frequency data is encrypted using the magnetic channel data generated by the magnetic signal generator module 303, to transmit the encrypted first radio frequency data to the RF transceiver module 302. The RF transceiver module 302 is configured to, based on the parameters of the radio frequency channel obtained by the microcontroller 301, receive response information of the magnetic channel data fed back by the RF card on a corresponding radio frequency channel to establish a radio frequency link with the RF card, and to transmit the encrypted first radio frequency data to the RF card via the radio frequency link. The RF transceiver module 302 is also configured to receive the encrypted second radio frequency data transmitted by the RF card via the radio frequency link, and to transmit the encrypted second radio frequency data to the microcontroller 301. The microcontroller 301 is also configured to decrypt the encrypted second radio frequency data using the magnetic channel data generated by the magnetic signal generator module 303, and to perform a corresponding applied process to decrypted data.

Specifically, the first radio frequency data may be application data to be sent from the radio frequency card reader to the radio frequency card; and the second radio frequency data may be response data of the application data fed back from the radio frequency card to the radio frequency card reader.

Figure 4:
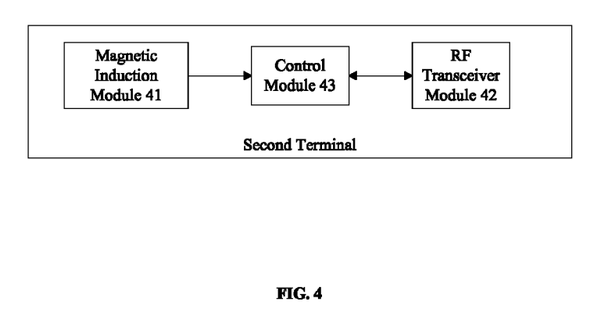
FIG. 4 illustrates a structure schematic diagram of an exemplary second terminal consistent with the disclosed embodiments.

Referring to FIG. 4, FIG. 4 is a structure schematic diagram of a second terminal provided by one embodiment of the present invention. The second terminal includes a magnetic induction module 41, an RF transceiver module 42 and a control module 43. The magnetic induction module 41 is configured to receive the transmitted magnetic channel data via a magnetic channel. The RF transceiver module 42 is configured to establish a radio frequency link with a peer device which transmits the magnetic channel data, to transmit the encrypted third radio frequency data to the peer device via the radio frequency link, and to receive the encrypted fourth radio frequency data transmitted by the peer device via the radio frequency link. The control module 43 is configured to generate the third radio frequency data, to encrypt the third radio frequency data using the magnetic channel data, to transmit the encrypted third radio frequency data to the RF transceiver module, and to decrypt the encrypted fourth radio frequency data using the magnetic channel data.

Specifically, the fourth radio frequency data may be application data sent from the first terminal to the second terminal; and the third radio frequency data may be response data of the application data fed back from the second terminal to the first terminal.

Figure 5:
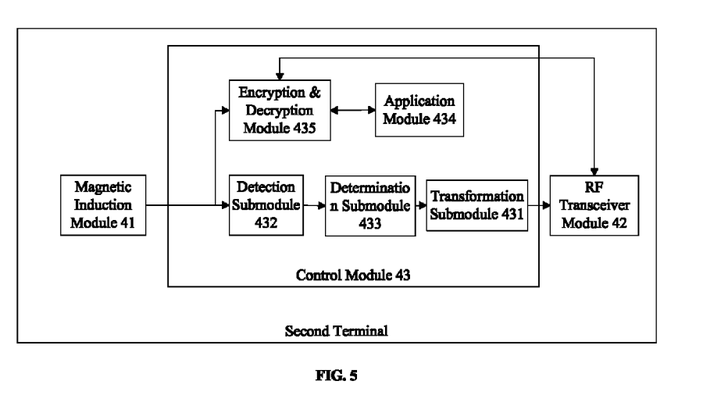
FIG. 5 illustrates a structure schematic diagram of another exemplary second terminal consistent with the disclosed embodiments.

Referring to FIG. 5, FIG. 5 is a structure schematic diagram of a second terminal provided by another embodiment of the present invention. The second terminal includes a magnetic induction module 41, an RF transceiver module 42 and a control module 43. The control module 43 includes a transformation sub-module 431, a detection sub-module 432, a determination sub-module 433, an application module 434, and an encryption and decryption module 435. The magnetic induction module 41 is configured to receive the magnetic channel data sent from an external device via a magnetic channel. The detection sub-module 432 is configured to detect magnetic signal strength of the magnetic channel data received by the magnetic induction module 41. The determination sub-module 433 is configured to determine whether the detected magnetic signal strength is greater than a preset value. When the determination sub-module 433 determines that the magnetic signal strength is greater than the preset value, the transformation sub-module 431 is configured to, based on the magnetic channel data received by the magnetic induction module 41, calculate the parameters of the radio frequency channel. The RF transceiver module 42 is configured to, based on the parameters of the radio frequency channel, send response information of the magnetic channel data on a corresponding radio frequency channel to the first terminal to establish a radio frequency link with the first terminal. The application module 434 is configured to generate the third radio frequency data, and to transmit the third radio frequency data to the encryption and decryption module 435. The encryption and decryption module 435 is configured to encrypt the third radio frequency data using the magnetic channel data received by the magnetic induction module 41, and to transmit the encrypted third radio frequency data to the RF transceiver module 42. The RF transceiver module 42 is configured to, after the encrypted third radio frequency data is transmitted via the first terminal, encrypt the fourth radio frequency data, and to transmit the encrypted fourth radio frequency data to the encryption and decryption module 435. The encryption and decryption module 435 is configured to decrypt the encrypted fourth radio frequency data using the magnetic channel data received by the magnetic induction module 41, and transmit the decrypted fourth radio frequency data to the application module 434. The application module 434 is configured to perform a corresponding applied process for the fourth radio frequency data decrypted by the encryption and decryption module 435.

In the embodiment, based on the magnetic channel data received by the magnetic induction module 41, the method of calculating the parameters of the radio frequency channel by the transformation sub-module 431 may include performing an irreversible transformation to the magnetic channel data received by the magnetic induction module 41 and generating the corresponding parameters of the radio frequency channel based on the result of the transformation. Based on the parameters of the radio frequency channel, the RF transceiver module 42 receives and transmits the RF information on the corresponding radio frequency channel. In the embodiment, the parameters of the radio frequency channel include an RF frequency point and an address. Based on the RF frequency point and the address, the corresponding radio frequency channel can be obtained. The fourth radio frequency data may be application data sent from the first terminal to the second terminal; and the third radio frequency data may be response data of the application data fed back from the second terminal to the first terminal. In the embodiment, the encryption and decryption module 435 may also be integrated in the magnetic induction module 41 or the application module 434. That is, the magnetic induction module 41 or the application module 434 encrypts and decrypts the radio frequency data.

In the embodiment, a second terminal receives the randomly generated magnetic channel data sent from a first terminal by a magnetic induction module. A transformation sub-module performs an irreversible transformation to the generated magnetic channel data and generates the parameters of the radio frequency channel based on the result of the transformation. A transformation sub-module feeds back the response information of the magnetic channel data to the first terminal, thus a radio frequency link is established. The RF transceiver module receives the encrypted radio frequency data sent from the first terminal on the radio frequency link, avoiding the risk that the preset security key is intercepted or decrypted. Even if an attacker obtains the parameters of the current radio frequency channel by analyses, the attacker cannot obtain original data information of the magnetic channel, enhancing the security of the magnetic channel data as a secret key for data encryption. That is, by using the first terminal of the embodiment, even if the attacker fakes a magnetic communication RF base station using a public protocol specification, and establishes a connection with the second terminal activated by the first terminal from a distant location, because the generated magnetic channel data cannot be obtained when the first terminal activates the second terminal, the process of encrypting or decrypting the RF data cannot be completed. A substantive transaction attack cannot be implemented, further enhancing the security of the radio frequency link data exchanging process. At the same time, this implementation does not require a dedicated key distribution management system, thereby reducing the difficulty and costs of security maintenance.

In the embodiment, the second terminal may be a terminal with a built-in RF SIM card or SD card. Of course, based on principles and roles of the embodiment, it is understood that other RF devices can also be used.

Figure 6:
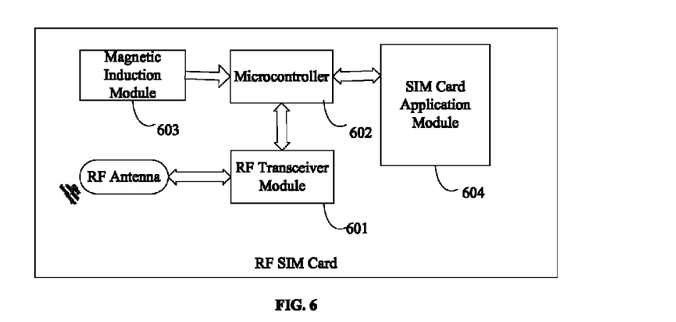
FIG. 6 illustrates a structure schematic diagram of an exemplary RF SIM card consistent with the disclosed embodiments.

Referring to FIG. 6, FIG. 6 is a structure schematic diagram of an RF SIM card provided by one embodiment of the present invention. The SIM card includes at least an RF transceiver module 601, a microcontroller 602, a magnetic induction module 603, and a SIM card application module 604. The RF transceiver module 601 includes an RF antenna. The RF antenna is configured to detect and radiate an RF signal. The magnetic induction module 603 is configured to induce magnetic signal strength of the magnetic channel data sent from RF card reader device, and receive the magnetic channel data. The RF transceiver module 601 connected to the microcontroller 602 is configured to transmit/receive RF signals by the RF antenna. The microcontroller 602 is configured to process the received and transmitted RF information and the magnetic channel information. The process includes detecting magnetic signal strength of the magnetic channel data generated by the card reader and received by the magnetic induction module 603, and determines whether the detected magnetic signal strength is greater than a preset value. When a judgment result is that the magnetic signal strength is greater than the preset value, based on the magnetic channel data, the parameters of the radio frequency channel are calculated. Specifically, the magnetic channel data can perform an irreversible transformation to obtain a corresponding frequency point and address. Based on the calculated frequency point and address, response information of the magnetic channel data is fed back to the card reader device by the RF transceiver module 601 to establish an RF link to the card reader device. The SIM card application module 604 is configured to perform a corresponding SIM card application, including generating the third radio frequency data. The microcontroller 602 is configured to encrypt the third radio frequency data using the magnetic channel data, and transmit the encrypted third radio frequency data to the RF transceiver module 601. The RF transceiver module 601 is configured to transmit the encrypted fourth radio frequency data to the card reader device via the RF link. The RF transceiver module 601 is also configured to receive the encrypted fourth radio frequency data transmitted by the card reader device via the RF link. The microcontroller 602 is also configured to decrypt the received encrypted fourth radio frequency data using the magnetic channel data. The SIM card application module 604 is also configured to perform a corresponding applied process for the decrypted radio frequency data.

Specifically, the fourth radio frequency data may be application data sent from the card reader to the radio frequency SIM card; and the third radio frequency data may be response data of the application data fed back from the radio frequency SIM card to the card reader.

Figure 7:
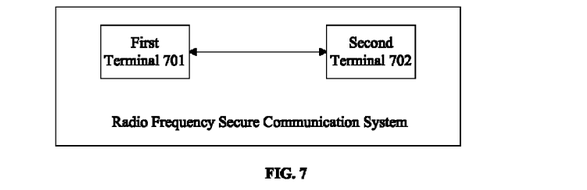
FIG. 7 illustrates a schematic diagram of an exemplary secure RF communication system consistent with the disclosed embodiments.

A secure RF communication system is also provided in the embodiment. Referring to FIG. 7, FIG. 7 is a schematic diagram of an exemplary secure RF communication system consistent with the disclosed embodiments. The secure RF communication system includes at least one first terminal 701 and at least one second terminal 702. The first terminal 701 is configured to generate magnetic channel data randomly, and to establish a radio frequency link with the second terminal 702 using the generated magnetic communication data. The first terminal 701 is configured to encrypt the radio frequency data using the generated magnetic channel data, and then to transmit the encrypted radio frequency data to the second terminal 702 via the established radio frequency link. The first terminal 701 is also configured to decrypt the radio frequency response data fed back from the second terminal 702 using the generated magnetic channel data.

Figure 8:
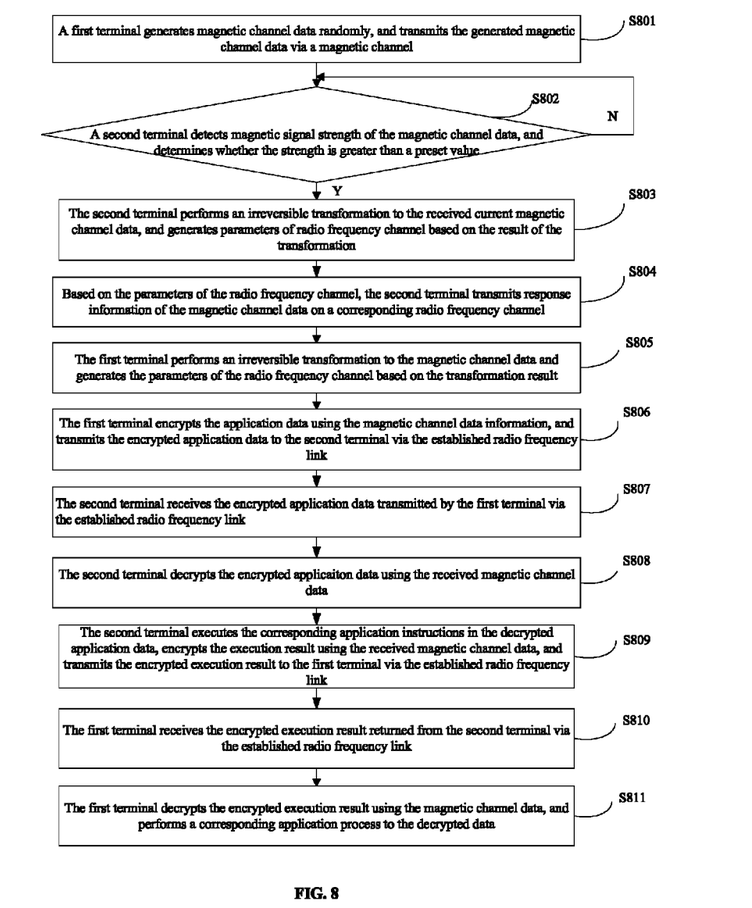
FIG. 8 illustrates a flow chart of an exemplary method for radio frequency secure communication of a secure RF communication system shown in FIG. 7 consistent with the disclosed embodiments.

Based on the above secure RF communication system, a method for radio frequency secure communication is also provided in the embodiment. The method for radio frequency secure communication of the present embodiment is further illustrated through some specific embodiments in combination with the drawings provided below. Please refer to which is shown in FIG. 8, the method for radio frequency secure communication of the embodiment includes the following steps:

S801: a first terminal generates magnetic channel data randomly, and transmits the generated magnetic channel data via a magnetic channel.

S802: a second terminal detects magnetic signal strength of the magnetic channel data, and determines whether the magnetic signal strength is greater than a preset value. If so, the process goes to S803; if not, the process continues to detect the magnetic signal strength of the magnetic channel data.

S803: the second terminal performs an irreversible transformation to the received current magnetic channel data, and generates parameters of radio frequency channel based on the result of the transformation.

S804: based on the parameters of the radio frequency channel, the second terminal transmits response information of the magnetic channel data on a corresponding radio frequency channel.

S805: the first terminal performs an irreversible transformation to the magnetic channel data and generates the parameters of the radio frequency channel based on the transformation result. Based on the parameters of the radio frequency channel, the first terminal receives the response information of the magnetic channel data sent from the second terminal of magnetic communication on the corresponding radio frequency channel, and completes establishment of a radio frequency link.

In the embodiment, the parameters of the radio frequency channel include an RF frequency point and an address. The corresponding radio frequency channel may be obtained by the RF frequency point and the address. The irreversible transformation implemented by the second terminal and the irreversible transformation implemented by the first terminal are the same and can obtain the same transformation result. Based on the transformation result and the same algorithm (e.g., encryption algorithm), the second terminal generates the same frequency point of the radio frequency and address.

S806: the first terminal encrypts the application data using the magnetic channel data information, and transmits the encrypted application data to the second terminal via the established radio frequency link.

S807: the second terminal receives the encrypted application data transmitted by the first terminal via the established radio frequency link.

S808: the second terminal decrypts the encrypted application data using the received magnetic channel data.

S809: the second terminal executes the corresponding application instructions in the decrypted application data, encrypts the execution result using the received magnetic channel data, and transmits the encrypted execution result to the first terminal via the established radio frequency link.

S810: the first terminal receives the encrypted execution result returned from the second terminal via the established radio frequency link.

S811: the first terminal decrypts the encrypted execution result using the magnetic channel data, and performs a corresponding application process to the decrypted data. Then, the first terminal may continue to encrypt the processing result using the magnetic channel data, and return the encrypted processing result to the second terminal.

In the embodiment, the RF data transmitted on the RF link is encrypted using the magnetic channel data transmitted on the magnetic channel. That is, the data transmitted on the RF link is encrypted using security control information transmitted on the magnetic channel. Because transmission distance of the magnetic channel is short and it is not easy to be intercepted, even if the attacker fakes a first terminal using a public protocol specification, and establishes a connection with the activated second terminal from a distant location, because the magnetic channel data as a security key for data encryption cannot be stolen, the process of encrypting or decrypting the RF data cannot be completed, avoiding the risk that the preset security key is intercepted or decrypted. A substantive transaction attack cannot be implemented, enhancing the security of the radio frequency link data exchanging process. At the same time, the RF data transmitted on the RF link is directly encrypted using the magnetic channel data and a dedicated key distribution management system is not required, thereby reducing the difficulty and costs of security maintenance. Based on the magnetic channel data, the first terminal and the second terminal calculate the parameters of the radio frequency channel and establish a corresponding radio frequency link, further simplifying the RF link establishment process.

The above contents are the further detailed descriptions of the present invention in conjunction with particular embodiments, and cannot determine that the specific implementations of the present invention are only limited to these descriptions. As to those skilled in the art of the present invention, some simple deductions or replacements made, on the premise of not departing from the conceptions of the present invention, shall be regarded in the protection scope of the present invention.

What is claimed is:

1. A method for radio frequency secure communication, comprising:
    generating magnetic channel data, and transmitting the magnetic channel data to a peer device via a magnetic channel;
    establishing a radio frequency link with the peer device which feeds back response information of the magnetic channel data;
    generating first radio frequency data, and transmitting encrypted first radio frequency data to the peer device via the radio frequency link, wherein the first radio frequency data is encrypted using the magnetic channel data; and receiving encrypted second radio frequency data transmitted by the peer device via the radio frequency link and decrypting the encrypted second radio frequency data using the magnetic channel data;

wherein establishing a radio frequency link with a peer device which feeds back response information of the magnetic channel data includes: based on the magnetic channel data, calculating parameters of the radio frequency channel; and based on the parameters of the radio frequency channel, receiving the response information of the magnetic channel data fed back from the peer device on a corresponding radio frequency channel; and wherein the parameters of the radio frequency channel include an RF frequency point and a radio frequency address.

2. The method according to claim 1, wherein:
the first radio frequency data is application data; and
the second radio frequency data is response data of the application data.

3. The method according to claim 1, wherein:
the magnetic channel data is generated randomly.

4. A method for radio frequency secure communication, comprising:
receiving magnetic channel data via a magnetic channel;
establishing a radio frequency link with a peer device which sends the magnetic channel data;
generating third radio frequency data, encrypting the third radio frequency data using the magnetic channel data, and transmitting the encrypted third radio frequency data to the peer device via the radio frequency link; and
receiving encrypted fourth radio frequency data transmitted by the peer device via the radio frequency link, and decrypting the encrypted fourth radio frequency data using the magnetic channel data;
wherein establishing a radio frequency link with a peer device which transmits the magnetic channel data includes: based on the received magnetic channel data, calculating parameters of the radio frequency channel; and based on the parameters of the radio frequency channel, sending the response information of the magnetic channel data to the peer device on a corresponding radio frequency channel; and wherein the parameters of the radio frequency channel include an RF frequency point and a radio frequency address.

5. The method according to claim 4, before calculating parameters of the radio frequency channel based on the magnetic channel data, further including:
detecting magnetic signal strength of the magnetic channel data;
determining whether the detected magnetic signal strength is greater than a preset value; and
if the detected magnetic signal strength is greater than the preset value, based on the received magnetic channel data, calculating parameters of the radio frequency channel.

6. The method according to claim 4, wherein:
the fourth radio frequency data is application data; and
the third radio frequency data is response data of the application data.

7. A terminal, comprising:
a magnetic signal generator configured to generate magnetic channel data and to transmit the magnetic channel data via a magnetic channel;

a radio frequency transceiver configured to establish a radio frequency link with a peer device which feeds back response information of the magnetic channel data, to transmit encrypted first radio frequency data to the peer device via the radio frequency link, and to receive encrypted second radio frequency data transmitted by the peer device via the radio frequency link; and a controller configured to generate the first radio frequency data, to encrypt the first radio frequency data using the magnetic channel data, to transmit the encrypted first radio frequency data to the radio frequency transceiver, and to decrypt the encrypted second radio frequency data using the magnetic channel data;

wherein establishing a radio frequency link with a peer device which transmits the magnetic channel data includes: based on the received magnetic channel data, calculating parameters of the radio frequency channel; and based on the parameters of the radio frequency channel, sending the response information of the magnetic channel data to the peer device on a corresponding radio frequency channel; and wherein the parameters of the radio frequency channel include an RF frequency point and a radio frequency address.

8. The terminal according to claim 7, wherein:
the magnetic signal generator includes a magnetic channel data generator and a magnetic signal generator;
the magnetic channel data generator is configured to generate the magnetic channel data; and
the magnetic signal generator is configured to transmit the magnetic channel data via the magnetic channel.

9. The terminal according to claim 7, wherein:
controller the application is further configured to: generate the first radio frequency data, transmit the first radio frequency data, and to perform a corresponding applied process to the decrypted second radio frequency data; and the encryption and decryption encrypt the first radio frequency data using the magnetic channel data, to transmit the encrypted first radio frequency data to the radio frequency transceiver, to decrypt the encrypted second radio frequency data transmitted by the peer device using the magnetic channel data, and to transmit the decrypted second radio frequency data.

10. A terminal, comprising:
a magnetic inductor configured to receive magnetic channel data sent from outside via a magnetic channel;

a radio frequency transceiver configured to establish a radio frequency link with a peer device which transmits the magnetic channel data, to transmit the encrypted third radio frequency data to the peer device via the radio frequency link, and receive the encrypted fourth radio frequency data transmitted by the peer device via the radio frequency link; and a controller configured to generate the third radio frequency data, to encrypt the third radio frequency data using the magnetic channel data, to transmit the encrypted third radio frequency data to the radio frequency transceiver, and to decrypt the encrypted fourth radio frequency data using the magnetic channel data;

wherein establishing a radio frequency link with a peer device which transmits the magnetic channel data includes: based on the received magnetic channel data, calculating parameters of the radio frequency channel; and based on the parameters of the radio frequency channel, sending the response information of the magnetic channel data to the peer device on a corresponding radio frequency channel; and wherein the parameters of the radio frequency channel include an RF frequency point and a radio frequency address.

11. The terminal according to claim 10, wherein:
the controller is further configured to:
detect magnetic signal strength of the magnetic channel data;
the determine whether the detected magnetic signal strength is greater than a preset value; and
the transformation based on the magnetic channel data, calculate the parameters of the radio frequency channel when it is determined that the magnetic signal strength is greater than the preset value.

12. The terminal according to claim 10, wherein:
controller the application is further configured to: generate the third radio frequency data, to transmit the third radio frequency data, and to perform a corresponding applied process to decrypted fourth radio frequency data; and
the encryption and decryption after encrypting the third radio frequency data using the magnetic channel data, transmit the encrypted third radio frequency data to the radio frequency transceiver, to decrypt the encrypted fourth radio frequency data transmitted by the peer device using the magnetic channel data, and to transmit the decrypted data.

13. A secure RF communication system, comprising:
at least one first terminal according to claim 7; and
at least one second terminal according to claim 10,
wherein the first terminal and the second terminal transmit magnetic channel data via a magnetic channel, and decrypt and encrypt the radio frequency data transmitted on the radio frequency link between the first terminal and the second terminal using the magnetic channel data.

14. The system according to claim 13, wherein:
the first terminal is a card reader, and the second terminal is a terminal with a built-in radio frequency card;
the RF card is one of a radio frequency SIM card or a radio frequency SD card.

* * * * *